United States Patent
Hörmann (10) Patent No.: US 11,566,686 B2
(45) Date of Patent: Jan. 31, 2023

(54) PLANAR SPIRAL GEARBOX AND DOOR DRIVE COMPONENT AND DOOR DRIVE HAVING SAID GEARBOX

(71) Applicant: Marantec Antriebs—und Steuerungstechnik GmbH & Co. KG, Marienfeld (DE)

(72) Inventor: Michael Hörmann, Halle (DE)

(73) Assignee: Marantec Antriebs—und Steuerungstechnik GmbH & Co. KG, Marienfeld (DE)

( * ) Notice: Subject to any disclaimer, the term of this patent is extended or adjusted under 35 U.S.C. 154(b) by 101 days.

(21) Appl. No.: 17/307,151

(22) Filed: May 4, 2021

(65) Prior Publication Data

US 2021/0348671 A1 Nov. 11, 2021

(30) Foreign Application Priority Data

May 7, 2020 (DE) ...................... 20 2020 102 568.6

(51) Int. Cl.
*F16H 1/12* (2006.01)
*E05F 15/668* (2015.01)
*F16H 55/17* (2006.01)

(52) U.S. Cl.
CPC ........... *F16H 1/125* (2013.01); *E05F 15/668* (2015.01); *F16H 55/17* (2013.01); *E05Y 2201/71* (2013.01); *E05Y 2900/106* (2013.01); *E05Y 2900/132* (2013.01)

(58) Field of Classification Search
CPC ......... F16H 1/125; F16H 55/17; E05F 15/668
See application file for complete search history.

(56) References Cited

U.S. PATENT DOCUMENTS

| 755,051 | A | * | 3/1904 | Schmick | ................. | F16H 1/125 |
| | | | | | | 74/424.5 |
| 1,245,621 | A | * | 11/1917 | Schmick | ................. | F16H 1/125 |
| | | | | | | 74/424.5 |
| 1,422,000 | A | * | 7/1922 | Schmick | ................... | F16H 1/24 |
| | | | | | | 74/424.5 |
| 2004/0237689 | A1 | * | 12/2004 | Hiltbrand | ................ | F16H 1/125 |
| | | | | | | 74/457 |
| 2021/0239185 | A1 | * | 8/2021 | Hagihara | ................. | F16H 1/12 |

* cited by examiner

*Primary Examiner* — Terence Boes
(74) *Attorney, Agent, or Firm* — Dilworth & Barrese, LLP

(57) ABSTRACT

The invention relates to a planar spiral gearbox, in particular for use in a door system, comprising: a gear, in particular a scroll plate, having a planar side on which a spiral toothed arrangement is arranged having at least one tooth that has a spiral tooth progression; and a cylindrical gear, in particular a torus gear, that has an external toothed arrangement at its jacket surface, wherein the spiral toothed arrangement of the gear is in meshing engagement with the external toothed arrangement of the cylindrical gear, with the gear having at least one additional toothed arrangement section that is radially spaced apart from an axis of rotation of the gear and serves for engagement of a drive toothed arrangement.

18 Claims, 12 Drawing Sheets

PLANAR SPIRAL GEARBOX AND DOOR DRIVE COMPONENT AND DOOR DRIVE HAVING SAID GEARBOX

BACKGROUND OF THE INVENTION

The present invention relates to a planar spiral gearbox and to a door drive component and to a door drive having said gearbox.

Planar spiral gearboxes that are also called planar spiral worm gearboxes or planar worm gearboxes are generally known from the prior art.

EP 1 402 200 B1, for example, shows a planar spiral gearbox in which the two gear teeth meshing with one another are specifically shaped.

Synergistic advantages are in particular produced in combination with a door drive when using a planar spiral gearbox. A separate brake unit thus always also has to be provided at the door drive in the worm gearboxes used up to now as a rule since a door drive also always requires a so-called "fall arrester". It is different in contrast on use of a planar spiral gearbox since it serves as a "fall arrester" solely due to its self-locking in spring balanced door systems. In addition, there is the fact that—unlike with the previous door drives—the "fall arrester" is not destroyed in the event it is triggered.

The term door drive that is used in the following is to be understood very generally in the present case. It is very generally a closure for a building opening. The door drives mentioned below therefore relate to drives for industrial doors, sliding doors, sectional doors, fast action doors, garage doors, such as underground garage doors, and similar closure devices.

It is furthermore of advantage that a planar spiral gearbox makes high gear ratios possible (up to 1:200) so that the gearbox itself can be configured as considerably smaller than the conventional gearboxes.

Furthermore, smaller motors can be installed due to the higher gear ratio and the motor electronics can also be designed as smaller and more compact since the motor itself consumes less energy due to a more efficient control. It is hereby possible to obtain a very much smaller and compact drive that does not project much, that can be installed more simply, easily, and flexibly and that nevertheless has identical performance data.

There is nevertheless the continuous endeavor to further reduce the size of the motor unit of a door drive to provide a drive that can be used as universally as possible. It is also desirable to provide a drive that covers a wide gear ratio and is particularly safe against failure.

SUMMARY OF THE INVENTION

The above-mentioned problems are overcome with the aid of a planar spiral gearbox that has all the features herein.

Provision is accordingly made that the planar spiral gearbox in accordance with the invention, in particular for use in a door system, a has a gear, in particular a scroll plate, having a planar side on which a spiral toothed arrangement having at least one tooth is arranged that has a spiral tooth progression and comprises a cylindrical gear, in particular a torus gear, that has external teeth at its jacket surface, with the spiral toothed arrangement of the gear being in meshing engagement with the external toothed arrangement of the cylindrical gear. The invention is characterized in that the gear has at least one additional toothed arrangement section that is radially spaced apart from an axis of rotation of the gear and serves for engagement of a drive toothed arrangement.

In accordance with the prior art, the output shaft of a drive is provided with or is simply rotationally fixedly connected to the scroll plate at the output side. The output shaft of the drive here rotated in the axis of rotation of the scroll plate.

To now use the force of a drive output by an output shaft in an improved manner, the present invention provides an additional toothed arrangement section that serves for the engagement of a drive toothed arrangement. The output shaft of a drive accordingly now no longer rotates in the axis of rotation of the scroll plate, but rather in an axis differing therefrom. Since the additional toothed arrangement section is moreover spaced apart from the axis of rotation, a favorable gear ratio acts on the gearbox so that the scroll plate is driven by a greater force.

Provision can be made here that the additional toothed arrangement section is radially arranged at the same distance around the axis of rotation of the scroll plate.

Provision can be made in accordance with a modification of the invention that the additional toothed arrangement section has a cylindrical jacket shape whose axis is identical to the axis of rotation of the gear and that has a toothed arrangement at its inner and/or outer side to engage a drive toothed arrangement.

The additional toothed arrangement sections can here be arranged at a side of the gear that is oppositely disposed to the planar side having the spiral toothed arrangement and/or starts from it.

Provision can be made in accordance with a further development of the invention that the additional toothed arrangement section has a radial distance from the axis of rotation of the gear that is greater than the maximum radial distance of the spiral toothed arrangement from the axis of rotation. The additional toothed arrangement section can therefore accordingly surround or encompass the spiral toothed arrangement such that it can also simply be arranged on the continuation of the spiral plane, with the tooth grooves of such an additional toothed arrangement section, for example, being aligned radially toward the axis of rotation of the gear.

Provision can furthermore be made in accordance with the invention that the spiral tooth progression or the spiral tooth progressions corresponds/correspond to the progression of a spiral whose origin lies on the axis of rotation of the gear, with the spiral tooth progression preferably corresponding to an Archimedean spiral.

Provision can likewise be made in accordance with the invention that the additional toothed arrangement section is arranged at a projection that surrounds the spiral toothed arrangement and extends radially outwardly so that the additional toothed arrangement section is perpendicular to the axis of rotation or that includes an acute angle with the perpendicular on the axis of rotation.

Provision can be made in accordance with an optional modification of the invention that the additional toothed arrangement section is arranged at a side of the gear that faces the planar side that has the spiral toothed arrangement.

It can likewise be covered in accordance with the invention that a plurality of additional toothed arrangement sections are provided of which each one has a toothed arrangement for engagement of a drive toothed arrangement, with the plurality of additional toothed arrangement sections preferably generating different transmission ratios in the planar spiral gearbox.

A plurality of drives that are independent of one another can also be used to drive the gearbox by the provision of a plurality of additional toothed arrangement sections so that a redundancy is produced with respect to the drive that significantly reduces the failure safety of a gearbox drive designed in this manner. The different transmission ratios furthermore permit the targeted arrangement of a drive toothed arrangement for a specific application case so that a universal usability is achieved.

Provision can furthermore be made in accordance with the invention that the gear is configured only to be driven by its at least one additional toothed arrangement section. It is accordingly no longer necessary that—as previously normal—the gear in the form of a scroll plate is rotationally fixedly connected to an output shaft of a drive. The shafts of one or more drive motors accordingly lie on axes differing from the axis of rotation of the gear.

The invention furthermore also comprises a door drive component, in particular to drive a garage door, that comprises a planar spiral gearbox in accordance with one of the preceding variants and a case that surrounds the planar spiral gearbox and that has a plurality of openings for introducing a drive toothed arrangement of a drive motor for cooperation with one or more toothed arrangements of the at least one additional toothed arrangement section.

The case accordingly has a plurality of openings for leading through respective drive shafts that can be brought into engagement with an associated additional toothed arrangement section by means of a corresponding drive toothed arrangement, A decision can thus be made completely in accordance with the respectively required demands of the door drive component as to by which of the plurality of openings the planar spiral gearbox is to be driven. If, for example, a particularly heavy door has to be actuated, a plurality of openings can be equipped with drive shafts so that the plurality of shafts develop a higher power together. It is additionally of advantage in this process that there is then also redundancy with respect to a failure of a drive shaft or of a motor connected thereto. If then, for example, only the remaining one of the two motors is active, the door can admittedly be actuated more slowly, but can still be actuated, so that the functionality is maintained.

Provision can also be made in this process that the plurality of openings lead to different toothed arrangements of the additional toothed arrangement sections and/or to different additional toothed arrangement sections, with the openings preferably being components of a drive motor receiver in the case.

The required motors can thus be attached as required with their output shafts and drive toothed arrangements. A further advantage is the installation of the motor at a plurality of different positions so that the available space can be ideally used in dependence on the door type and characteristics.

The gear transmission ratio can furthermore be influenced by the choice of the motor connector, that is by the choice of the plurality of openings of the gearbox, since all the installation locations can have different additional toothed arrangement sections and accordingly different transmission ratios.

The invention additionally also comprises a door drive that comprises a planar spiral gearbox in accordance with one of the preceding variants or a door drive component in accordance with one of the preceding variants and at least one drive motor having a drive toothed arrangement that meshes with a toothed arrangement of the at least one additional toothed arrangement section, preferably in that a shaft of the drive motor driving the drive toothed arrangement is led through an opening in a case surrounding the planar spiral gearbox.

Provision can accordingly be made in accordance with a further development of the invention that a plurality of drive motors are provided to drive the planar spiral gearbox of which each one preferably cooperates with a different toothed arrangement of the at least one additional toothed arrangement section and/or with a separate additional toothed arrangement section.

The invention furthermore also comprises the use of a planar spiral gearbox in a door drive, wherein the planar spiral gearbox has a gear, in particular a scroll plate, that has a toothed arrangement having at least one tooth that has a spiral tooth progression and a cylindrical gear, in particular a torus gear, that has an external toothed arrangement at its jacket surface, with the gear being in meshing engagement with the cylindrical gear.

BRIEF DESCRIPTION OF THE DRAWINGS

Provision can furthermore be made in this process that the planar spiral gearbox is further developed in accordance with one of the preceding variants.

Further features, details and advantages of the invention will be explained with reference to the following description of the Figures. There are shown:

FIG. 5: an enlarged representation of the drive for actuating a door having a motor flanged on;

FIG. 6: an enlarged representation of the drive for actuating a door without a motor flanged on;

FIG. 11: a perspective view of a gearbox case having a planar spiral gearbox in accordance with the invention with drive motors flanged on, FIG. 12: a partial sectional representation of FIG. 11, FIG. 13: a cross-sectional view of the planar spiral gearbox in accordance with the invention with motors flanged on;

DESCRIPTION OF THE PREFERRED EMBODIMENTS

Figure 1:
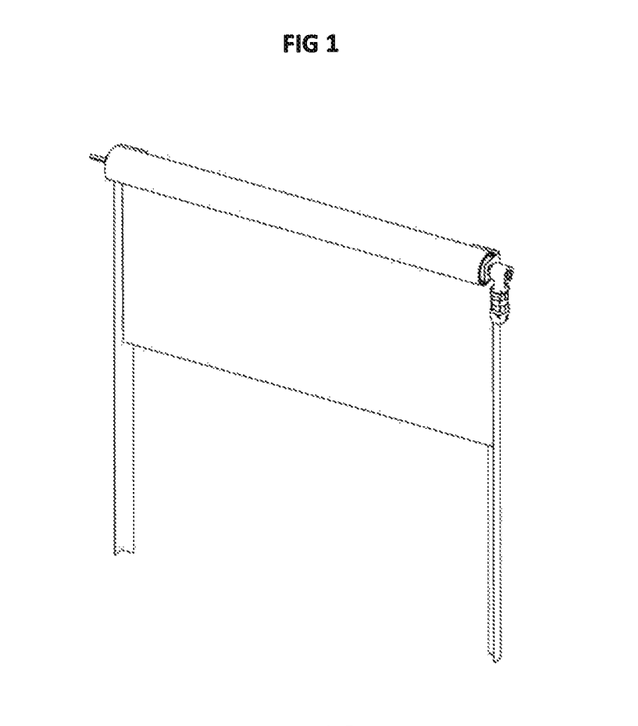
FIG. 1: a perspective view of a door having a drive that comprises a planar spiral gearbox.
Figure 2:
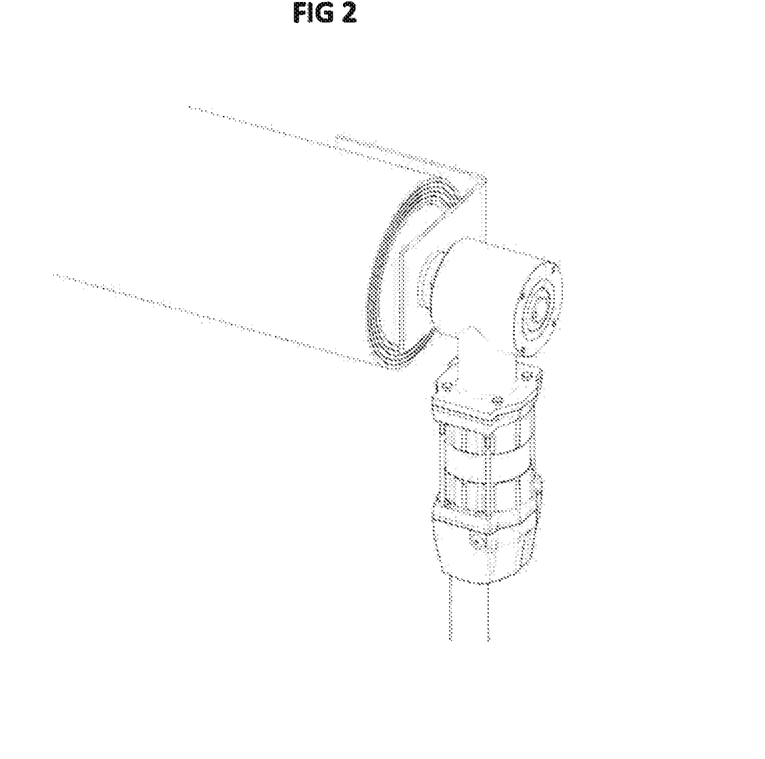
FIG. 2: an enlarged representation of the drive of FIG. 1.

FIGS. 1 to 4 show different application scenarios of a drive having a planar spiral gearbox with doors. FIGS. 1 and 2 thus show a roller door or a fast action door that is actuated by a door drive that has a planar spiral gearbox described in detail below.

Figure 3:
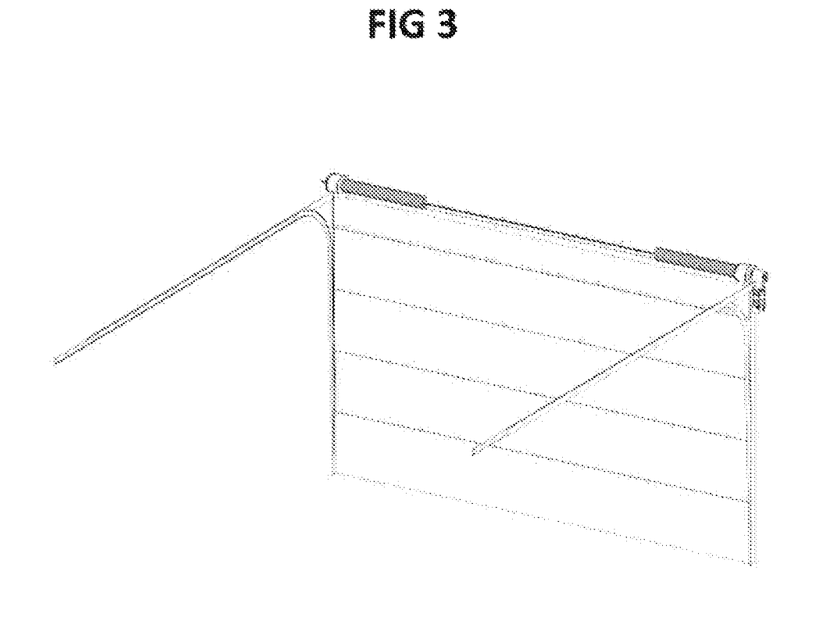
FIG. 3: a perspective view of a garage door having a drive that comprises a planar spiral gearbox.
Figure 4:
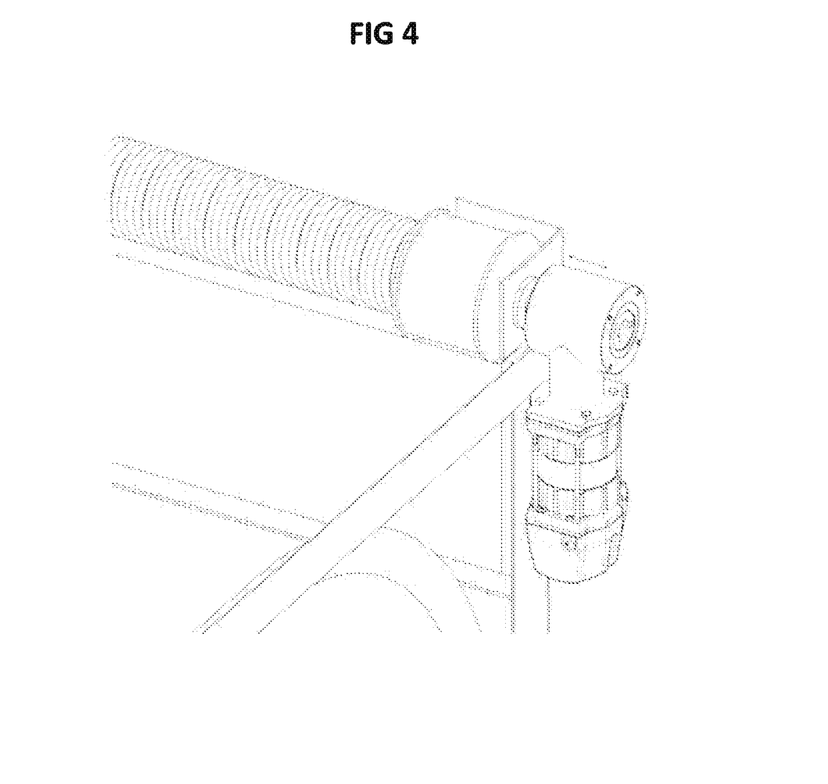
FIG. 4: an enlarged representation of the drive of FIG. 3.

FIGS. 2 and 3 show such a drive with reference to a sectional door. It is clear to the skilled person that such a drive motor can also advantageously be used for different door types such as sliding doors or the like. The use in garage door drives, in particular for a heavy duty use such as in underground garages, can also be implemented with such a door drive.

Figure 5:
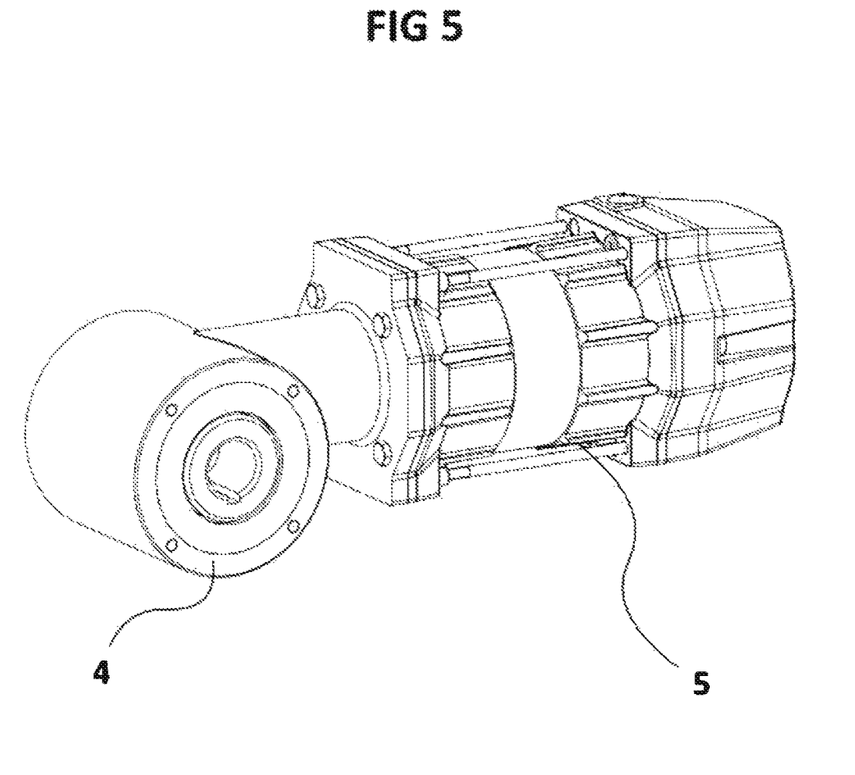
Figure 6:
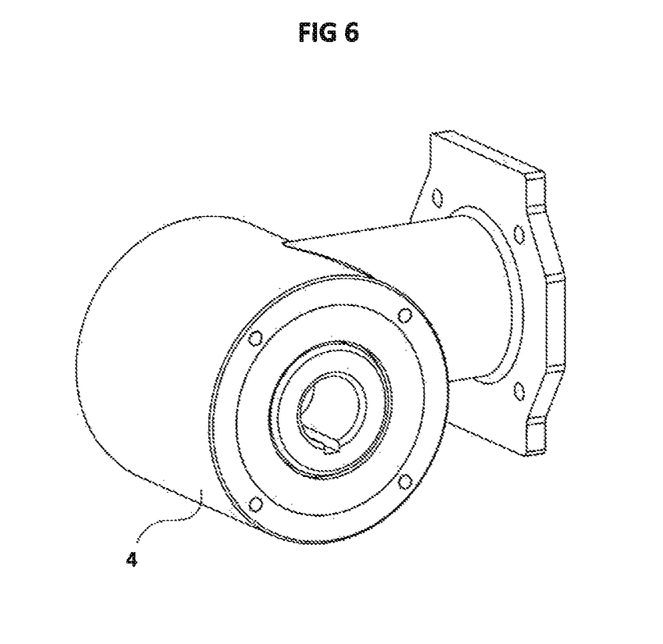

FIGS. 5 and 6 show an exemplary design of the planar spiral gearbox 4, a motor 5 flanged on (FIG. 5) and without a motor flanged on (FIG. 6). The shaft of the door to be actuated is installed in the receiver of the door shaft 6 and is rotationally fixedly fixed therein.

Figure 7:
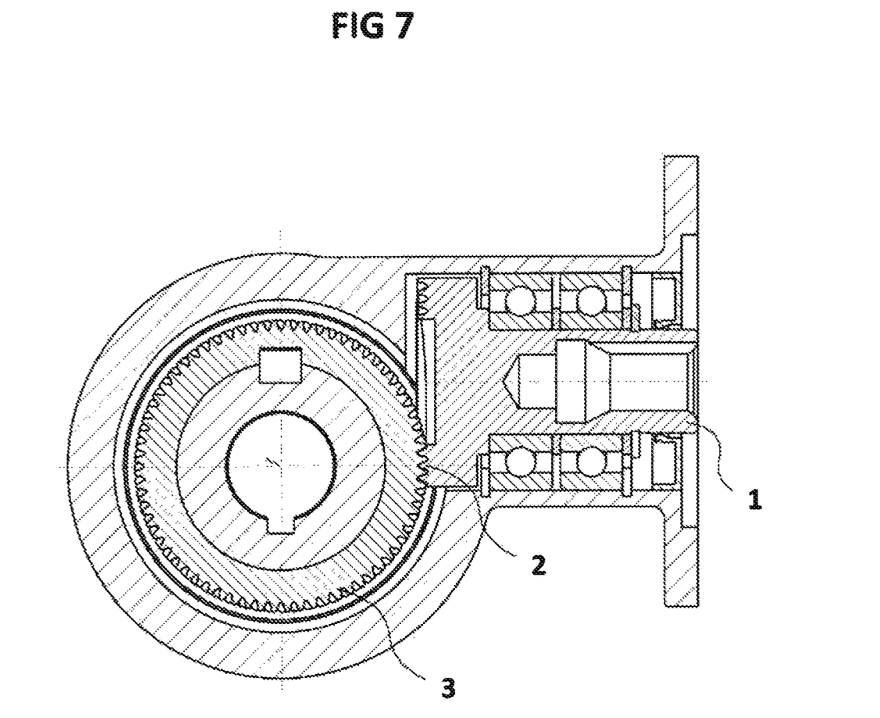
FIG. 7: a sectional representation of a planar spiral gearbox.

FIG. 7 shows a section of the exemplary design. The shaft 1 at the motor side is shown here that engages into the torus gear 3 via the scroll plate 2. The torus gear rotated about the torus gear axis of rotation on a rotation of the scroll plate due to the spiral design. In this respect, the shaft at the motor side is rotationally fixedly connected to the scroll plate in the prior art.

Figure 8:
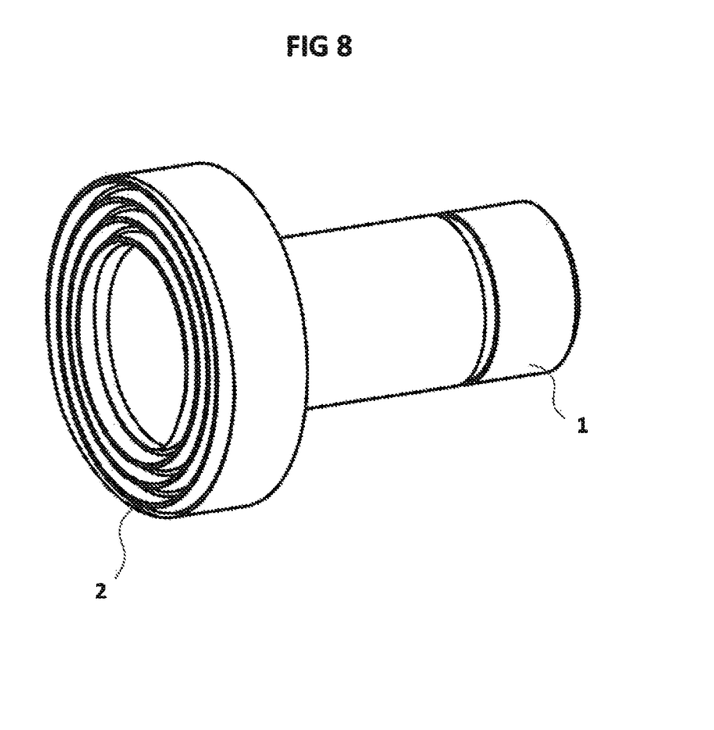
FIG. 8: a worm shaft at the motor side with a scroll plate.
Figure 9:
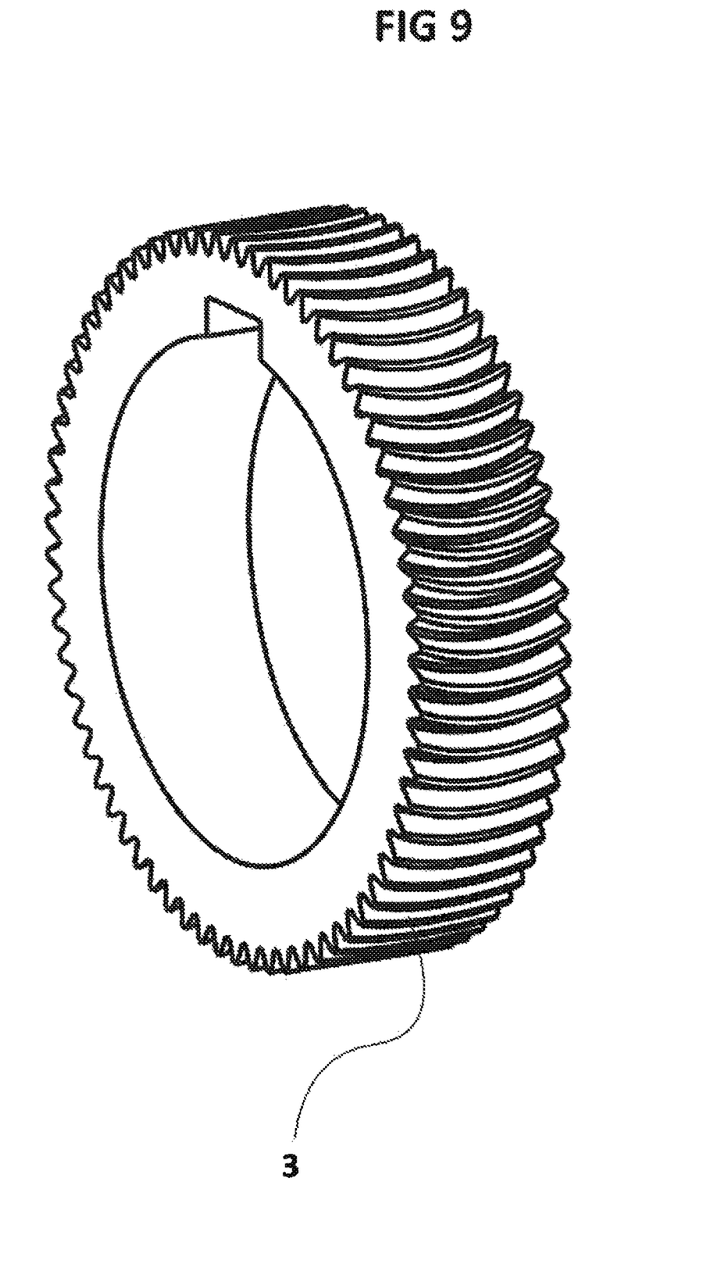
FIG. 9: a torus gear.

FIG. 8 shows the worm shaft 1 at the motor side having the scroll plate 2 and FIG. 9 shows the torus gear. It can be recognized here that the external toothed arrangement of the torus gear has a curved tooth profile so that there is a shape matched engagement of the scroll plate in the external toothed arrangement.

The following Figures show an embodiment of the invention that is based on a modification of the planar spiral gearbox.

Unliked in accordance with the prior art, the scroll plate is now not simply rotationally fixedly connected to a driving shaft, but rather has at least one additional toothed arrangement section at which an external toothed arrangement can engage to rotate the scroll plate.

Figure 10:
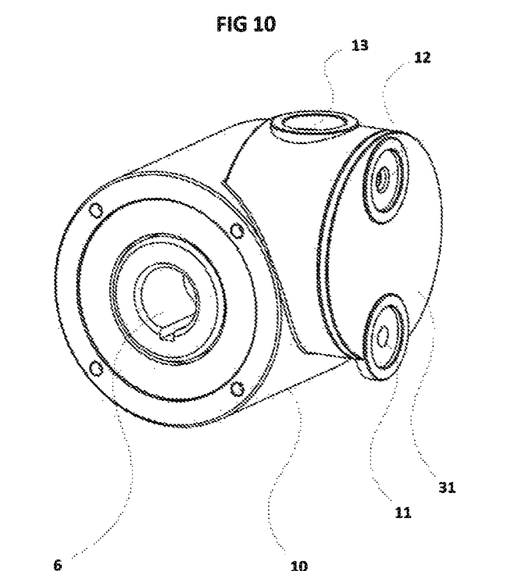
FIG. 10: a perspective view of a gearbox case having a planar spiral gearbox in accordance with the invention.

A gearbox case 10 having the receiver of the door shaft 6 is shown in FIG. 10. It can be recognized that the case 10 has a plurality of motor receivers, three 11, 12, 13 in the present case, of which each has an opening to lead through a drive shaft. It is thereby possible to bring a drive shaft or a drive toothed arrangement into active connection with one of the at least one additional toothed arrangement sections to cause the scroll plate to rotate.

Figure 11:
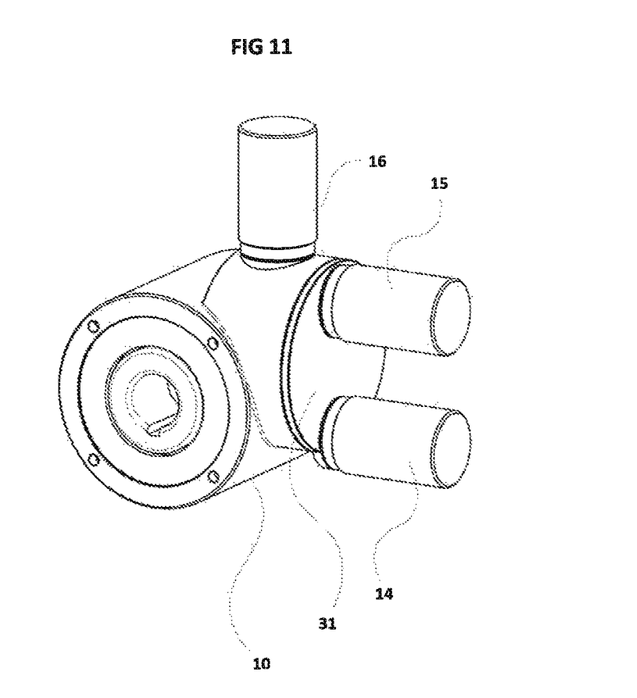

It can be seen from FIG. 11 that one to three motors can be installed in the three motor receivers, with the motor 14 being installed in the motor receiver 11, motor 15 in motor receiver 12, and motor 16 in motor receiver 13. The attachment of one of the plurality of motors is sufficient for an actuation of the door shaft 6, but it can be of advantage to flange on more than only one motor for performance reasons or also to reduce the likelihood of failure. The installation of the motor at a plurality of different positions is of further advantage due to the plurality of motor receivers so that the available space can be ideally used in dependence on the door type and characteristics. The gear transmission ratio can furthermore be influenced by the choice of the motor connector since all the installation locations can have different transmission ratios.

Ultimately, a plurality of motors can in be installed in one gearbox for a higher power requirement. Redundancy is also present in this case so that the door can still be opened and closed at a reduced speed on the failure of one motor. The installation can be implemented in installation positions 11 and 12. Alternatively, with an adapted installation plate 31, two motors can run on the same ring gear. To be able to allow the torque to develop ideally, provision can be made to use at least one frequency converter (FC). The aforesaid installation is, however, only by way of example. The possibility for installing motors on one plate can thus be freely selected. Only at least one motor has to enter into engagement with a ring gear. Three motors can, for example, also be installed on the installation plate. The installation plate can also be rotated for this purpose so that—as shown in FIG. 11, for example—the two motors 14 and 15 can be installed not as shown as perpendicular, but rather as horizontal or at any other angle.

Figure 12:
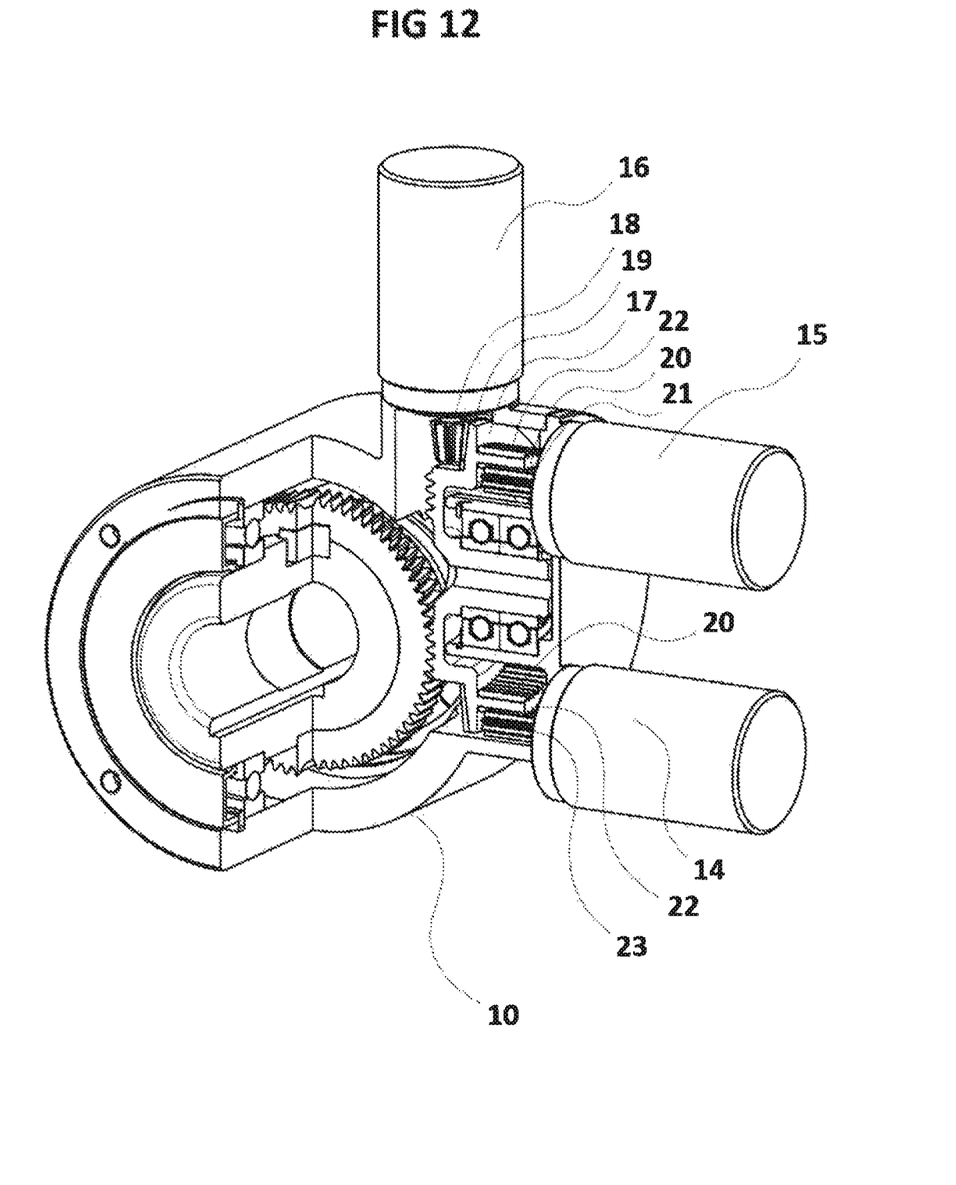

FIG. 12 shows a partial section of the drive of FIG. 11, with a motor being installed at the scroll plate 2 at three positions (known from FIG. 10 and FIG. 11). The motor 14, whose spur gear 23 engages into the planar spiral gear 17 into the front toothed arrangement 22, in motor receiver 11; the motor 15, whose spur gear 21 engages into the planar spiral gear 17 into the internal toothed arrangement 20, in motor receiver 12; the motor 16, whose spur gear 18 engages into the planar spiral gear 17 into the external toothed arrangement 19, in motor receiver 13.

The front toothed arrangement, the internal toothed arrangement, and the external toothed arrangement are each different additional toothed arrangement sections that are respective radially spaced apart from an axis of rotation of the gear and serve for engagement of a drive toothed arrangement. Due to the distance from the axis of rotation, an advantageous gear ratio also results in the rotation thereby caused of the scroll plate that would now have been generated with more force than on a direct rotation via the axis of rotation 1.

Figure 13:
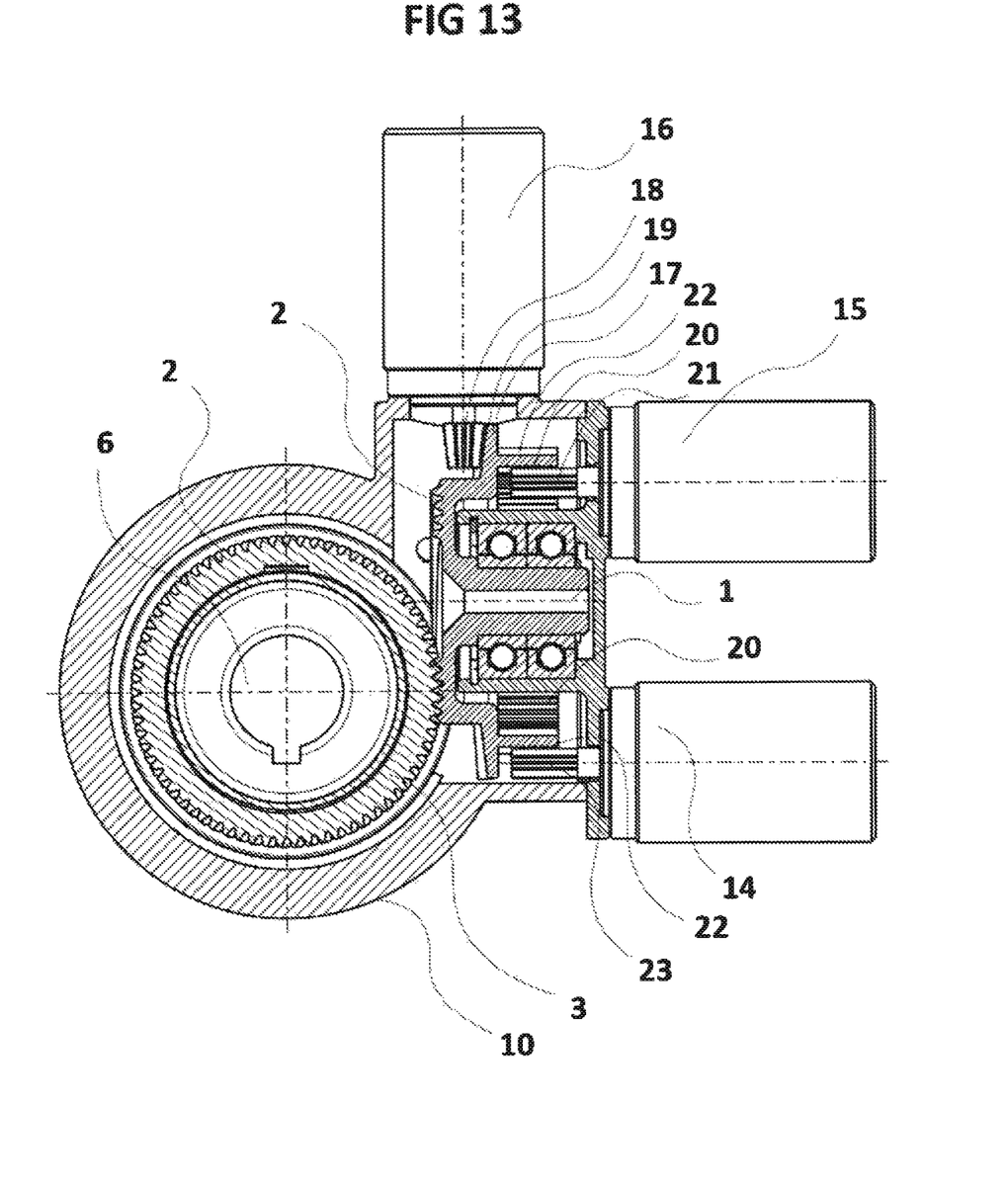

FIG. 13 shows a sectional view from which it can be recognized that the scroll plate has a plurality of additional toothed arrangement sections at sections that are outwardly directed radially from the spiral toothed arrangement, said additional toothed arrangement sections cooperating with corresponding shafts of motors to effect a rotation of the scroll plate.

Figure 14:
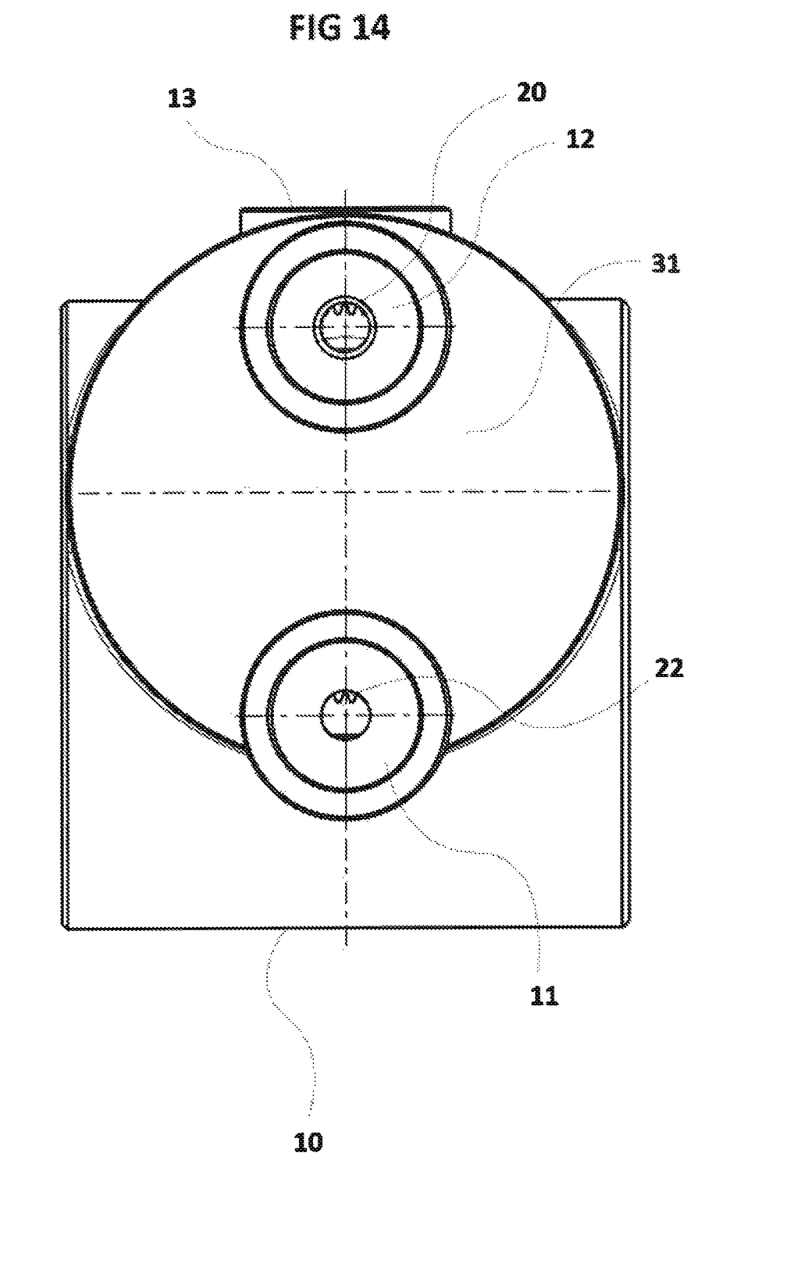
FIG. 14: a side view of a gearbox case having a planar spiral gearbox in accordance with the invention.

FIG. 14 again shows the motor receivers 11 and 12 having the visible external toothed arrangement 22 for the motor 14 and the internal toothed arrangement 20 for the motor 15 in the gearbox case 10. The motor receiver 13 for the motor 16 is furthermore recognizable. The gear transmission ratio is influenced by the choice of the motor connector since all the installation locations can have different transmission ratios. A very wide range of use thus results even though, for example, only a single motor is used.

Figure 15:
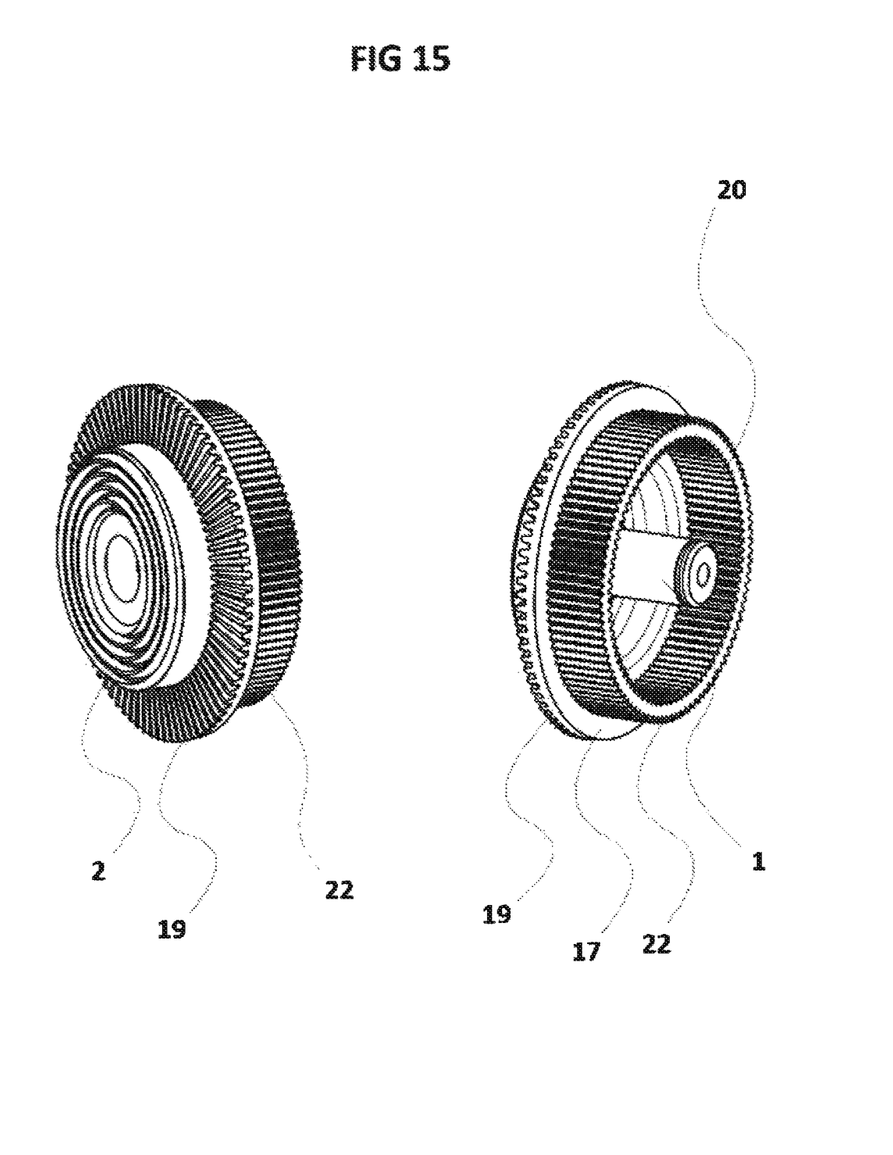
FIG. 15: a perspective view of a planar spiral gear having a plurality of additional toothed arrangement sections.

FIG. 15 shows a specific aspect of a planar spiral gear used by the invention having a plurality of additional toothed arrangement sections, namely the front toothed arrangement 19 for the motor 16, the internal toothed arrangement 20 for the motor 15, and the external toothed arrangement 22 for the motor 14.

Figure 16:
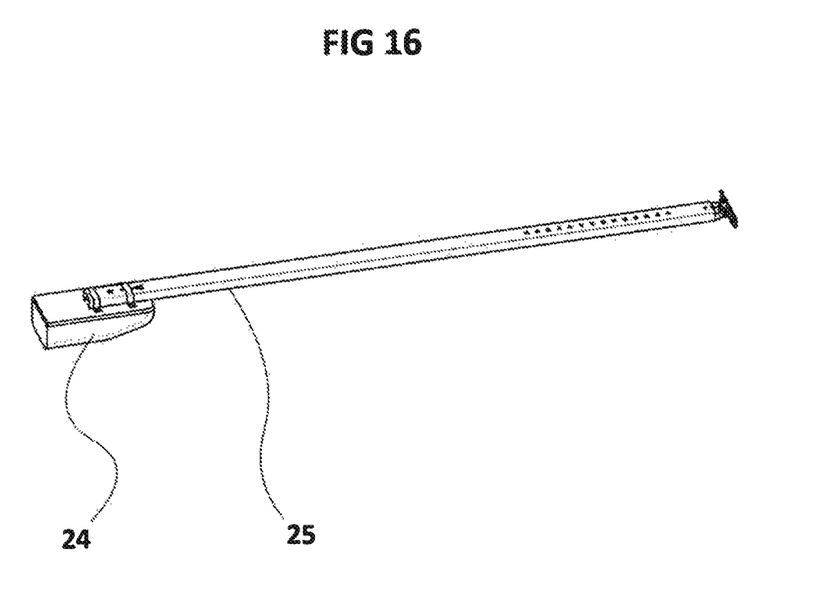
FIG. 16: a perspective view of a garage door drive in accordance with the invention.
Figure 17:
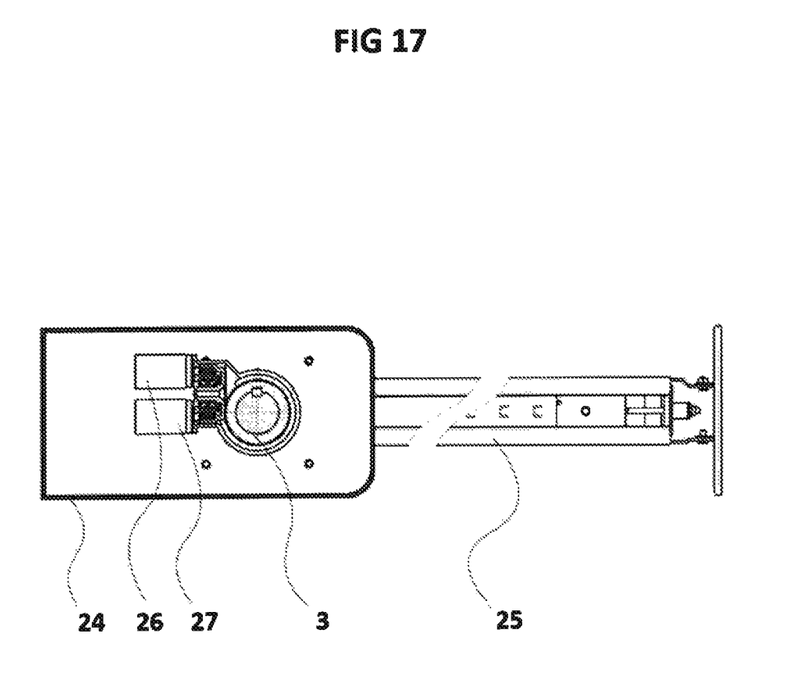
FIG. 17: a schematic plan view of an exemplary design of the garage door drive in accordance with the invention.
Figure 18:
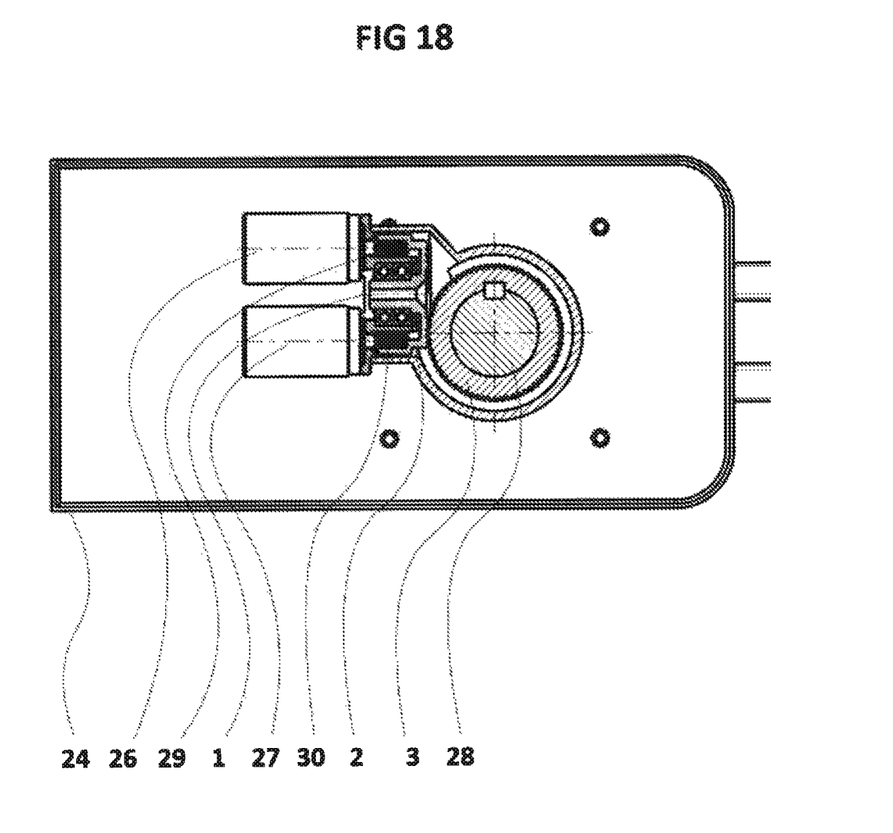
FIG. 18: an enlarged representation of the drive section of the garage door of FIG. 17.

FIGS. 16 to 18 show an exemplary design of a garage door drive. They comprise the drive housing 24 and the rail 25 in which the slide, not shown, runs and that in turn drives the garage door.

Garage door drives are rather arranged in a flat manner due to the principle since they are installed between the upwardly swinging garage door and the ceiling. The design shown in FIGS. 17 and 18 is therefore advantageous.

The rough design of the inner workings of the drive housing 24 with the rail 25 installed thereon is shown in FIG. 17. It can be seen here that two motors 26 and 27 are installed at the torus gear 3 via the scroll plate.

Only one motor is actually required for the operation and can be installed—depending on the use—as the motor 26 or 27. In heavy duty use or as redundancy in critical applications (for example in underground garages), both motors can be installed.

The design is illustrated in more detail in FIG. 18. The spur gear 29 of the motor 26 and the spur gear 30 of the motor 27 can be recognized here that act on the scroll plate 2. The scroll plate 2 engages into the torus gear that is connected to the drive gear of the toothed belt 28.

The invention claimed is:

1. A planar spiral gearbox, for use in a door system, comprising:
    a gear, as a scroll plate, having a planar side on which a spiral toothed arrangement is arranged having at least one tooth that has a spiral tooth progression; and
    a cylindrical gear, as a torus gear, that has an external toothed arrangement at its jacket surface, wherein
    the spiral toothed arrangement of the cylindrical gear is in meshing engagement with the external toothed arrangement of the cylindrical gear, and
    the gear has at least one additional toothed arrangement section that is radially spaced apart from an axis of rotation of the gear and serves for engagement of a drive toothed arrangement.

2. A planar spiral gearbox in accordance with claim 1, wherein the additional toothed arrangement section has a cylindrical jacket shape whose axis is identical to the axis of rotation of the gear and that has a toothed arrangement at its inner and/or outer side to engage a drive toothed arrangement.

3. A planar spiral gearbox in accordance with claim 1, wherein the additional toothed arrangement section is arranged at a side of the gear that is oppositely disposed the planar side that has the spiral toothed arrangement.

4. A planar spiral gearbox in accordance with claim 1, wherein the additional toothed arrangement section has a radial distance from the axis of rotation of the gear that is greater than the maximum radial distance of the spiral toothed arrangement from the axis of rotation.

5. A planar spiral gearbox in accordance with claim 1, wherein the spiral tooth progression or the spiral toothed arrangement corresponds to the progression of a spiral whose origin lies on the axis of rotation of the gear, with the spiral tooth progression preferably corresponding to an Archimedean spiral.

6. A planar spiral gearbox in accordance with claim 1, wherein the additional toothed arrangement section is arranged at a projection that surrounds the spiral toothed arrangement and extends radially outwardly so that the additional toothed arrangement section is perpendicular to the axis of rotation or includes an acute angle with the perpendicular on the axis of rotation.

7. A planar spiral gearbox in accordance with claim 1, wherein the additional toothed arrangement section is arranged at a side of the gear that faces the planar side that has the spiral toothed arrangement.

8. A planar spiral gearbox in accordance with claim 1, wherein a plurality of additional toothed arrangement sections are provided of which each one has a toothed arrangement for engagement of a drive toothed arrangement, with the plurality of additional toothed arrangement sections preferably generating different transmission ratios in the planar spiral gearbox.

9. A planar spiral gearbox in accordance with claim 1, wherein the gear is configured only to be driven by its at least one additional toothed arrangement section.

10. A door drive component comprising:
    a planar spiral gearbox in accordance with claim 1; and
    a case that surrounds the planar spiral gearbox and that has a plurality of openings for introducing a drive toothed arrangement of a drive motor for a cooperation with one or more toothed arrangements of the at least one additional toothed arrangement section.

11. A door drive component in accordance with claim 10, wherein the plurality of openings lead to different toothed arrangements of the additional toothed arrangement section and/or to different additional toothed arrangement sections, and
    the openings are preferably components of a drive motor receiver in the case.

12. A garage door drive, comprising:
    a planar spiral gearbox in accordance with claim 1; and
    at least one drive motor having a drive toothed arrangement that meshes with a toothed arrangement of the at least one additional toothed arrangement section,
    wherein preferably a shaft of the drive motor driving the drive toothed arrangement is led through an opening in a case surrounding the planar spiral gearbox.

13. A door drive in accordance with claim 12, wherein a plurality of drive motors are provided to drive the planar spiral gearbox of which each one preferably cooperates with a different toothed arrangement of the at least one additional toothed arrangement section and/or with a separate additional toothed arrangement section.

14. A planar spiral gearbox in accordance with claim 2, wherein the additional toothed arrangement section is arranged at a side of the gear that is oppositely disposed the planar side that has the spiral toothed arrangement.

15. A planar spiral gearbox in accordance with claim 14, wherein the additional toothed arrangement section has a radial distance from the axis of rotation of the gear that is greater than the maximum radial distance of the spiral toothed arrangement from the axis of rotation.

16. A planar spiral gearbox in accordance with claim 3, wherein the additional toothed arrangement section has a radial distance from the axis of rotation of the gear that is greater than the maximum radial distance of the spiral toothed arrangement from the axis of rotation.

17. A planar spiral gearbox in accordance with claim 2, wherein the additional toothed arrangement section has a radial distance from the axis of rotation of the gear that is greater than the maximum radial distance of the spiral toothed arrangement from the axis of rotation.

18. A planar spiral gearbox in accordance with claim 15, wherein the spiral tooth progression or the spiral toothed arrangement corresponds to the progression of a spiral whose origin lies on the axis of rotation of the gear, with the spiral tooth progression preferably corresponding to an Archimedean spiral.

\* \* \* \* \*